(12) United States Patent
Suzuki et al.

(10) Patent No.: US 12,403,747 B2
(45) Date of Patent: Sep. 2, 2025

(54) VEHICLE CONTROL DEVICE AND VEHICLE CONTROL METHOD

(71) Applicant: Nissan Motor Co., Ltd., Kanagawa (JP)

(72) Inventors: Masayasu Suzuki, Kanagawa (JP); Keiko Shishido, Kanagawa (JP); Tomoki Hirabayashi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/716,413

(22) PCT Filed: Dec. 6, 2021

(86) PCT No.: PCT/IB2021/000848
§ 371 (c)(1),
(2) Date: Jun. 4, 2024

(87) PCT Pub. No.: WO2023/105257
PCT Pub. Date: Jun. 15, 2023

(65) Prior Publication Data
US 2025/0108676 A1 Apr. 3, 2025

(51) Int. Cl.
*B60H 1/00* (2006.01)
(52) U.S. Cl.
CPC ..... *B60H 1/00742* (2013.01); *B60H 1/00821* (2013.01)
(58) Field of Classification Search
CPC .............. B60H 1/00742; B60H 1/00821
See application file for complete search history.

(56) References Cited

U.S. PATENT DOCUMENTS

| 11,414,085 | B2  | 8/2022  | Yamanaka et al. |
|------------|-----|---------|-----------------|
| 11,465,696 | B2  | 10/2022 | Suzuki et al.   |
| 11,748,671 | B2* | 9/2023  | Zemek .................. G06Q 10/20 705/5 |
| 2018/0218470 | A1 | 8/2018 | Belwafa et al. |
| 2019/0283536 | A1 | 9/2019 | Suzuki et al. |
| 2020/0290686 | A1 | 9/2020 | Suzuki et al. |
| 2020/0307352 | A1 | 10/2020 | Boston et al. |
| 2020/0307608 | A1 | 10/2020 | Yamanaka et al. |
| 2021/0221388 | A1* | 7/2021 | Zemek .................. G06Q 10/02 |
| 2021/0354642 | A1* | 11/2021 | Onodera ............ B60H 1/00371 |

FOREIGN PATENT DOCUMENTS

| CN | 108357396 A   | 8/2018 |
|----|---------------|--------|
| CN | 111746452 A   | 10/2020 |
| JP | S58-046611 U  | 3/1983 |

(Continued)

*Primary Examiner* — Abby J Flynn
*Assistant Examiner* — Kyle J Kingsland
(74) *Attorney, Agent, or Firm* — Osha Bergman Watanabe & Burton LLP

(57) ABSTRACT

A vehicle control device is used for a vehicle that simultaneously transports a user and a package. The vehicle control device includes a controller configured to: acquire an attribute of the user and an attribute of the package; determine whether the user and the package are loaded in the vehicle; and upon determining that the user and the package are loaded in the vehicle, perform air conditioning control according to the attribute of the user and the attribute of the package.

4 Claims, 8 Drawing Sheets

(56) References Cited

FOREIGN PATENT DOCUMENTS

| JP | 2018-135085 A | 8/2018 |
| JP | 2019/156351 A | 9/2019 |
| JP | 2019-217952 A | 12/2019 |
| JP | 2020-029165 A | 2/2020 |
| JP | 2020-157943 A | 10/2020 |

\* cited by examiner

FIG. 3

| ATTRIBUTES OF PACKAGE / ATTRIBUTES OF USER | PACKAGE CAUSING ALLERGY SYMPTOM | PACKAGE HAVING ODOR | PACKAGE REQUIRING REFRIGERATION | NO ATTRIBUTE |
|---|---|---|---|---|
| ALLERGY | REQUIRED | NOT REQUIRED | NOT REQUIRED | NOT REQUIRED |
| ODOR | NOT REQUIRED | REQUIRED | NOT REQUIRED | NOT REQUIRED |
| TEMPERATURE | NOT REQUIRED | NOT REQUIRED | REQUIRED | NOT REQUIRED |
| NO ATTRIBUTE | NOT REQUIRED | NOT REQUIRED | NOT REQUIRED | NOT REQUIRED |

FIG. 7
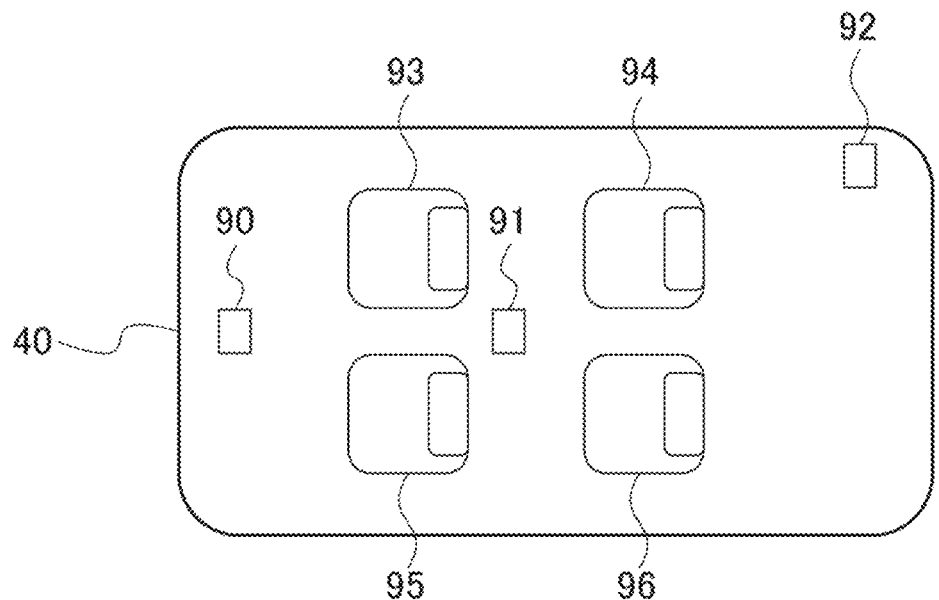
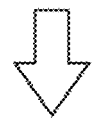
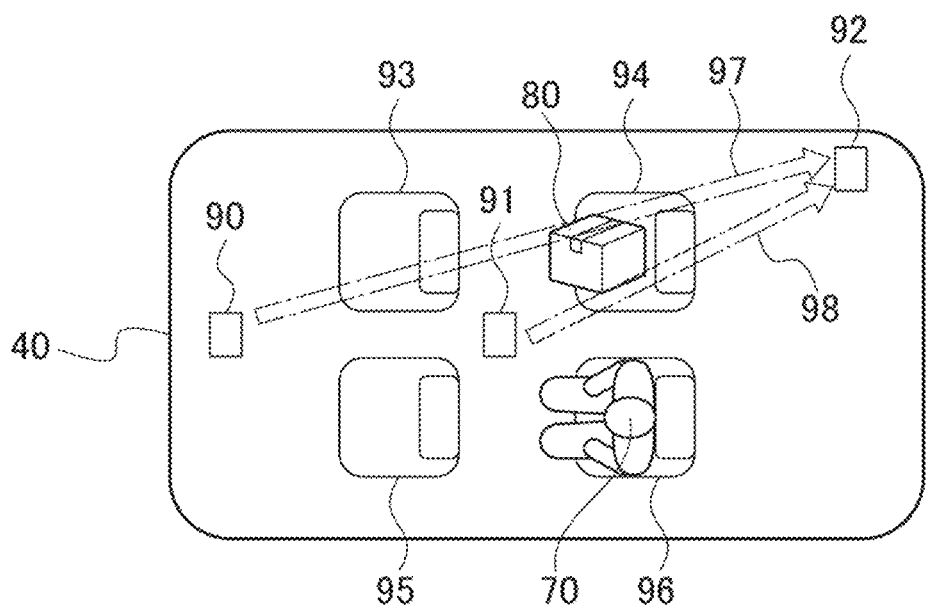

VEHICLE CONTROL DEVICE AND VEHICLE CONTROL METHOD

TECHNICAL FIELD

The present invention relates to a vehicle control device and a vehicle control method.

BACKGROUND ART

Conventionally, there has been known an invention for controlling an on-board device according to the type of a user's package (Patent Literature 1). The invention described in Patent Literature 1 controls an air conditioner to lower the temperature in the interior of the vehicle when the package is perceived to be vulnerable to high temperature.

CITATION LIST

Patent Literature

Patent Literature 1: Japanese Patent Application Publication No. 2020-157943

SUMMARY OF INVENTION

Problems to be Solved by Invention

However, the invention described in Patent Literature 1 does not consider the attributes of both the user and the package, although it is necessary to perform air conditioning control in consideration of the attributes of both the user and the package in the case of mixed transportation of passenger and freight in which the user and the package are transported and moved together.

The present invention has been made in view of the above-described problem, and an object the invention is to provide a vehicle control device and a vehicle control method capable of performing air conditioning control in consideration of attributes of both the user and the package.

Solution to Solve Problems

A vehicle control device in accordance with an embodiment of the present invention acquires an attribute of a user and an attribute of a package, determines whether the user and the package are loaded in a vehicle, and performs air conditioning control according to the attribute of the user and the attribute of the package upon determining that the user and the package are loaded in the vehicle.

Effects of Invention

According to the present invention, it is possible to perform air conditioning control in consideration of the attributes of both the user and the package.

BRIEF DESCRIPTION OF DRAWINGS

FIG. 3 is a diagram for explaining attributes of a user and attributes of a package.

FIG. 7 is a diagram illustrating an example of an air conditioning control method.

DESCRIPTION OF EMBODIMENTS

Embodiments of the present invention will now be described with reference to the drawings. In the description of the drawings, the same reference signs are used for the same parts, and the description thereof is omitted.

Figure 1:
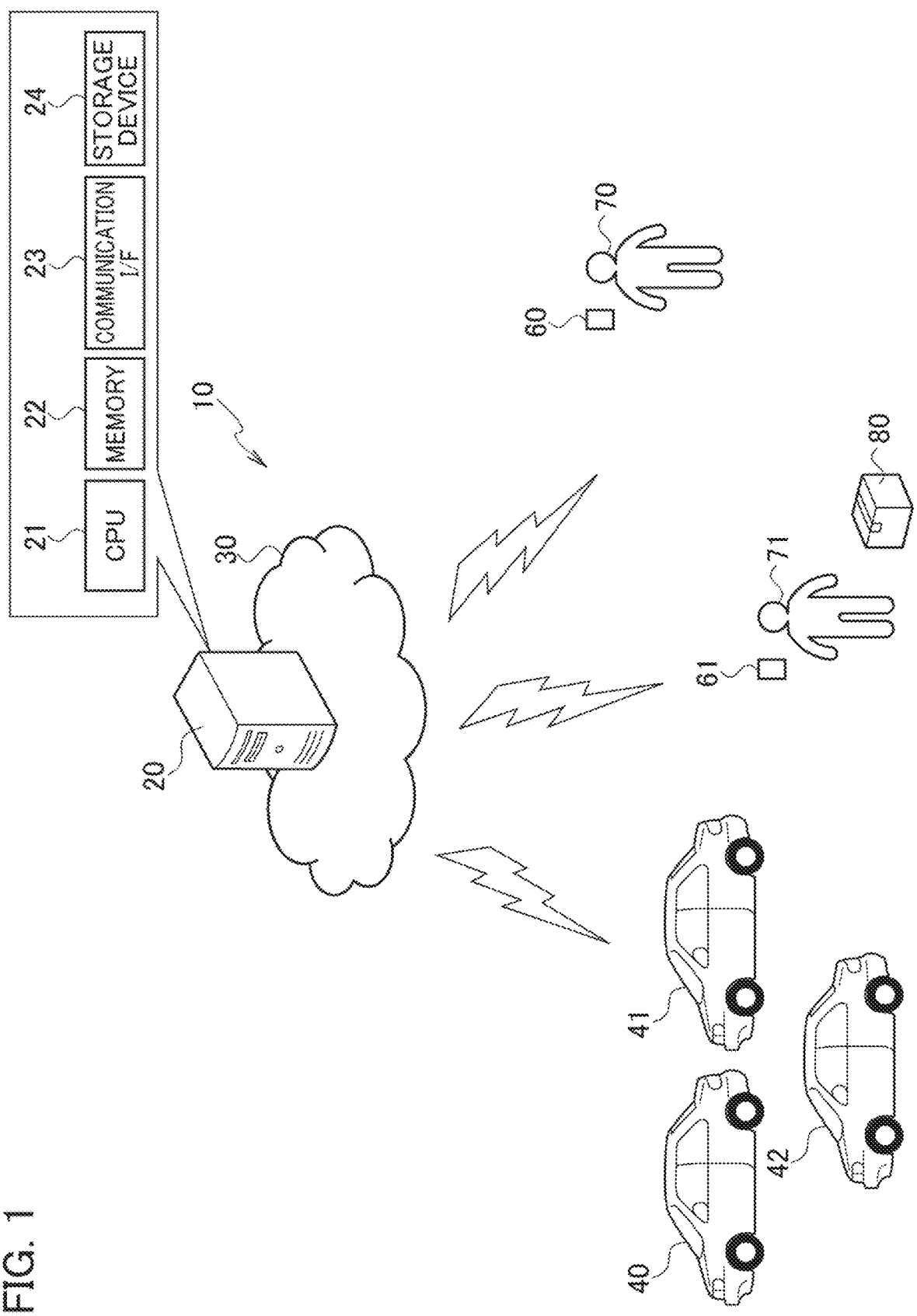
FIG. 1 is a schematic diagram of a system according to an embodiment of the present invention.

A configuration example of the system 10 according to the embodiment will be described with reference to FIGS. 1 and 2. As illustrated in FIG. 1, the system 10 includes a management server 20, a communication network 30, vehicle 40 to 42, a user 70, a communication device 60 owned by the user 70, a package operator 71, a communication device 61 owned by the package operator 71, and a package 80 handled by the package operator 71. FIG. 1 shows three vehicles, but the number of vehicle is not limited thereto. The system 10 may include four or more vehicles.

In this embodiment, the user 70 and the package 80 are loaded in the same vehicle. Such a form is referred to as "integration of passenger and freight transport". More specifically, "integration of passenger and freight transport" is defined as "a form of a transportation of freight and passengers, and an operation together". "Freight" is defined as "goods carried by a transportation means". "Transportation means" includes railways, buses, taxis, aircraft, ships, and the like. In this embodiment, "transportation means" is described as a vehicle. "Goods" refers mainly to package and parcel, the size of which is limited to those which can be loaded in a vehicle. "Goods" include animals (pets), plants, food and general merchandise. "Food" includes food that requires refrigeration (refrigerated food) and food that requires freezing (frozen food). In the "integration of passenger and freight transport", a space for passengers to stay and a space for freight to be loaded are usually clearly separated. In this embodiment, the transportation means is a vehicle, and a seat where passengers sit and a seat where cargo is loaded are clearly separated. Hereinafter, "goods" are referred to as package, and "passengers" are referred to as users. "Package operators" include pet shop employees, flower shop employees, lunch box shop employees, and internet supermarket employees. An internet supermarket is a service that accepts orders via the internet and delivers items directly to homes. In English-speaking countries, an internet supermarket is called an online supermarket or an online grocery. The "packages" in this embodiment includes pets, flowers, lunch boxes, and food items (including refrigerated food).

The management server 20 communicates with the vehicle 40 to 42 and the communication device 60 to 61 via the communication network 30. The management server 20 is a general-purpose computer (controller) including a central processing unit (CPU) 21, a memory 22, a communication I/F 23, and a storage device 24, and these components are electrically connected one another via a bus or the like (not illustrated). The management server 20 is used for the dispatch service of the vehicle 40 to 42. The location of the management server 20 is not particularly limited, but for example, the management server 20 is installed in a management center of an operator operating the vehicle 40 to 42.

The CPU 21 reads various programs stored in the storage device 24 and the like into the memory 22 and executes various commands contained in the programs. The memory 22 is a storage medium such as Read Only Memory (ROM) and Random Access Memory (RAM). The storage device 24 is a storage medium such as Solid State Drive (SSD) and Hard Disk Drive (HDD). A part (or all) of the system 10 including the functions of the management server 20 described below may be provided by an application (such as Software as a Service (SaaS)) arranged on the communication network 30.

The communication I/F 23 is implemented as hardware such as a network adapter, various communication software, and a combination thereof, and can realize wired or wireless communication via a communication network 30 and the like. The communication I/F 23 functions as an input unit and an output unit for transmitting and receiving data.

The communication network 30 is described as the Internet without limiting to this, and other wireless communication systems may be employed. The management server 20, the vehicle 40 to 42, and the communication device 60, 61 are connected to the communication network 30 by the Internet.

An example of the vehicle 40 to 42 is a taxi. The vehicle 40 to 42 may be an ordinary vehicle with a driver present or an autonomous vehicle without a driver present. An autonomous vehicle without a driver present may be described as a robotic taxi or an unmanned taxi. In this embodiment, the vehicle 40 to 42 is described as an autonomous vehicle without a driver. As described above, the vehicle 40 to 42 is a vehicle for "integration of passenger and freight transport".

The user 70 requests a vehicle using the communication device 60. Similarly, the package operator 71 requests a vehicle using the communication device 61. A vehicle dispatch application (hereinafter simply referred to as a vehicle dispatch app) used for reserving a vehicle is installed in the communication device 60, 61, and the user 70 and the package operator 71 request a vehicle using the vehicle dispatch app.

Next, a detailed configuration of the management server 20, the vehicle 40, and the communication device 60 and 61 will be described with reference to FIG. 2. Although the vehicle 41, 42 is omitted in FIG. 2, the vehicle 41 and 42 has the same configuration as the vehicle 40.

Figure 2:
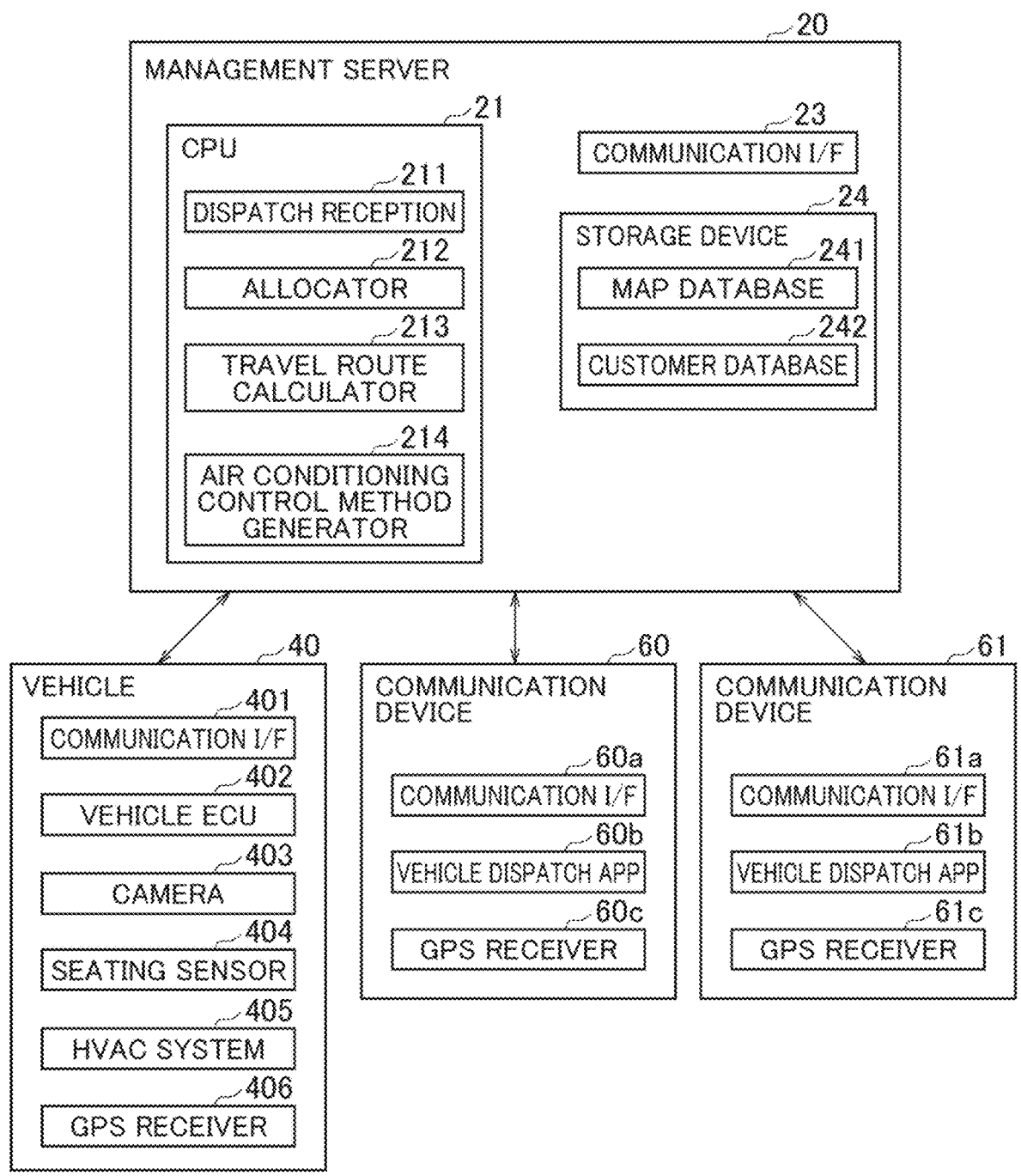
FIG. 2 is a functional block diagram of a management server, a communication device, a communication device, and a vehicle according to an embodiment of the present invention.

As illustrated in FIG. 2, the communication device 60 includes a communication I/F 60a, a vehicle dispatch app 60b, and a GPS receiver 60c. Similarly, the communication device 61 includes a communication I/F 61a, a vehicle dispatch app 61b, and a GPS receiver 61c. The communication I/F 60a and the communication I/F 61a have the same structure as the communication I/F 23, and communicate with the management server 20 via the communication network 30. As an example, the communication device 60, 61 is a portable terminal such as a smartphone or a tablet. The communication device 60, 61 may be a wearable device. Although not illustrated, the communication device 60, 61 includes a CPU, a memory, a storage device, and the like in the same manner as the management server 20.

The vehicle dispatch app 60b is used for vehicle requests as described above. The vehicle dispatch app 60b functions as a user interface when the user 70 requests a vehicle. The vehicle dispatch app 60b is realized by the CPU in the communication device 60 reading and executing a dedicated application program from a storage device in the communication device 60. When the user 70 uses the vehicle dispatch app 60b, that is, when requesting a vehicle, the user enters his/her own information into the vehicle dispatch app 60b in advance and registers it. Such pre-registration is a well-known technology and has been adopted in many applications. By performing pre-registration, unique identification information (also referred to as user ID, account ID, or the like.) is given to the user 70, and the user 70 can request a vehicle using the vehicle dispatch app 60b. The information to be entered in advance is, for example, the name, nickname, gender, address, telephone number, email address, payment method and attributes of the user 70.

The "attributes" to be registered in advance will now be described with reference to FIG. 3. The "attributes of the user 70" in this embodiment are information on the allergy of the user 70 and information on the preference on the air in an interior of a vehicle. There are many types of allergies. Examples include allergies caused by pets (such as mites, mold) and allergies caused by plants (such as pollen). The user 70 registers information on allergies as attributes in advance. "Preference on the air in an interior of a vehicle" in this embodiment means the preference of the user 70 on the odor and temperature in an interior of the vehicle. If the user does not like something that emits an odor, this fact is registered as "preference information" in advance. As for the room temperature of the vehicle, the room temperature the user feels comfortable varies from user to user. The user 70 registers the temperature the user feels comfortable as "preference information" in advance. It is noted that the "temperature the user feels comfortable" may vary depending on the season. Therefore, the system may require the user 70 to enter a temperature for each season.

The package operator 71 also registers the attributes of the package 80 to be handled in advance. The "attributes of the package 80" are information on an allergy of the package 80, information on an odor of the package 80, and information on a temperature of the package 80. When the package 80 is a pet, plant, and the like, the package operator 71 registers that the package 80 has an allergy such as mite, mold, pollen, and the like. If the package 80 is a lunch box emitting an odor, the package operator 71 registers that the package 80 emits an odor. If the package 80 is refrigerated food, the package operator 71 registers that temperature needs to be controlled to 10 degrees or less.

In this embodiment, the air conditioning inside the vehicle is controlled according to "attributes of the user 70" and "attributes of the package 80." As illustrated in FIG. 3, when allergy information is registered as an attribute of the user 70 and allergy information is registered as an attribute of the package 80, the air conditioning control is performed. When odor information is registered as an attribute of the user 70 and odor information is registered as an attribute of the package 80, the air conditioning control is performed. When temperature information is registered as an attribute of the user 70 and temperature information is registered as an attribute of the package 80, the air conditioning control is performed. As illustrated in FIG. 3, the air conditioning control is not performed in any other combination. There are users who do not have allergies, users who do not care about odors, and users who accept any temperature. Such users do not have to register attributes. For a user who has not registered the attribute ("no attribute" in FIG. 3), air conditioning control is not performed regardless of the attribute of the package. There are packages that do not cause allergy, packages that do not emit odor, and packages that do not require temperature control. The package operator 71 does not have to register the attributes of such packages. For packages whose attributes are not registered ("no attributes" in FIG. 3), air conditioning control is not performed regardless of the attributes of the user. However, what is not performed is air conditioning control according to the attributes. Normal air conditioning control is performed. "Normal air conditioning control" refers to air conditioning control set in advance according to the outside temperature and the like.

After the pre-registration is completed, the user 70 enters a desired place to be loaded into the vehicle, desired time to be loaded into a vehicle, desired destination (place to be unloaded from a vehicle), desired arrival time, desired seat, and the like into the vehicle dispatch app 60b, and requests a vehicle. For example, the user 70 selects a desired seat from among available seats (unreserved seats). Selection of a seat is optional. When the user 70 does not select a seat, a seat is automatically selected by the management server 20. The vehicle dispatch app 60b transmits a vehicle dispatch request to the management server 20 according to an input of the user 70. Further, the communication device 60 displays various information (such as vehicle dispatch request receipt, estimated arrival time, estimated route) included in the signal returned from the management server 20 in response to the vehicle dispatch request on a display. However, the method of implementing the vehicle dispatch app 60b is not limited thereto. For example, the communication device 60 may access the server that provides the function of the vehicle dispatch app 60b, receive the function provision, and display the execution result of the function transmitted from the server by a browser. Similarly, after the pre-registration is completed, the package operator 71 enters the desired place to be loaded into the vehicle, desired time to be loaded into the vehicle, desired destination (place to be unloaded), desired arrival time, desired seat, and the like into the dispatch app 61b, and requests a vehicle.

The position information of the communication device 60 acquired by the GPS receiver 60c is transmitted to the management server 20 at any timing. Similarly, the position information of the communication device 61 acquired by the GPS receiver 61c is transmitted to the management server 20 at any timing.

As illustrated in FIG. 2, the vehicle 40 includes a communication I/F 401, a vehicle electronic control unit (ECU) 402, a camera 403, a seating sensor 404, a heating, ventilation, and air conditioning (HVAC) system 405, and a GPS receiver 406. The communication I/F 401 has the same configuration as the communication I/F 23 and communicates with the management server 20 via the communication network 30. The vehicle ECU 402 is a computer for controlling the vehicle 40. The vehicle ECU 402 controls various actuators (such as brake actuators, accelerator actuators, steering actuators) based on commands received from the management server 20. The camera 403 is installed in the interior of the vehicle 40. The camera 403 detects the seating position of the user 70 (the position of the seat on which the user 70 is seated). Further, the camera 403 detects the position of the seat on which the package 80 is placed. These positions may be detected by the seating sensor 404 instead of the camera 403. The HVAC system 405 controls the temperature, humidity, and airflow in the interior of the vehicle 40 and includes a cooling device, a heating device, a blower, and the like. The position information of the vehicle 40 acquired by the GPS receiver 406 is transmitted to the management server 20 at any timing.

As illustrated in FIG. 2, the CPU 21 of the management server 20 includes, as an example of a plurality of functions, a vehicle dispatch reception 211, an allocator 212, a travel route calculator 213, and an air conditioning control method generator 214. A map database 241 and a customer database 242 are stored in a storage device 24 of the management server 20.

The map database 241 stores map information necessary for a route guidance such as road information and facility information. The map information includes the number of lanes of a road, road width information, and road undulation information. Further, the map information includes road signs indicating speed limits, one-way traffic, crosswalks, and markings. The map information stored in the map database 241 may be high-precision map data (HD MAP) or normal map data (SD MAP).

The customer database 242 stores information (such as name, attributes) of the user 70 and the package operator 71, a vehicle usage history, and the like.

The vehicle dispatch reception 211 receives a vehicle dispatch request of the user 70 entered into the communication device 60 (vehicle dispatch app 60b). The vehicle dispatch reception 211 receives a vehicle dispatch request entered into the communication device 61 (vehicle dispatch app 61b) by the package operator 71. The vehicle dispatch reception 211 has a function of notifying the communication device 60 that the vehicle dispatch request of the user 70 has been received, the scheduled arrival time at the place to be loaded into the vehicle, the scheduled travel route to the destination, and the like. Similarly, the vehicle dispatch reception 211 has a function of notifying the communication device 61 that the vehicle dispatch request of the package operator 71 has been received, the scheduled arrival time at the place to be loaded into the vehicle, the scheduled travel route to the destination, and the like.

The vehicle dispatch reception 211 acquires position information of the user 70 from the communication device 60, acquires position information of the package operator 71 from the communication device 61, and acquires the position information of the vehicle 40 from the vehicle 40. "Position information of the user 70" means the position information of the communication device 60 possessed by the user 70. "Position information of the package operator 71" means the position information of the communication device 61 possessed by the package operator 71. The vehicle dispatch reception 211 outputs the acquired position information to the allocator 212 and the travel route calculator 213.

The allocator 212 allocates an appropriate vehicle from a plurality of vehicles 40 to 42 based on the received vehicle dispatch request. For example, the allocator 212 can allocate the vehicle closest to the desired place to be loaded into the vehicle for the user 70 or the package operator 71 from the plurality of vehicles 40 to 42 to improve efficiency. In this embodiment, a description is given, supposing that the vehicle 40 is allocated.

The travel route calculator 213 calculates the travel route from the current location of the vehicle 40 to the destination via the place to be loaded into the vehicle by referring to the location information obtained from the vehicle dispatch reception 211 and the map database 241. In this embodiment, it is assumed that the user 70 and the package 80 share a ride in order to improve the operation efficiency of the vehicle 40. Regarding the ride-sharing, it is possible to confirm with the user 70 and the package operator 71 whether to permit the ride-sharing, but the ride-sharing will be described as being permitted. It does not matter whether the user 70 is in the vehicle first or the package 80 is loaded the vehicle first. If the destinations of the user 70 and the package 80 are in the same direction, the efficient operation of the vehicle 40 can be realized, but for the application of the present invention, the destinations need not be in the same direction.

The air conditioning control method generator 214 acquires the attributes of the user 70 and the package 80 by referring to the customer database 242. The air conditioning control method generator 214 generates the air conditioning control method according to the attributes of the user 70 and the package 80. The air conditioning control method generator 214 transmits the generated air conditioning control method to the HVAC system 405.

Figure 4:
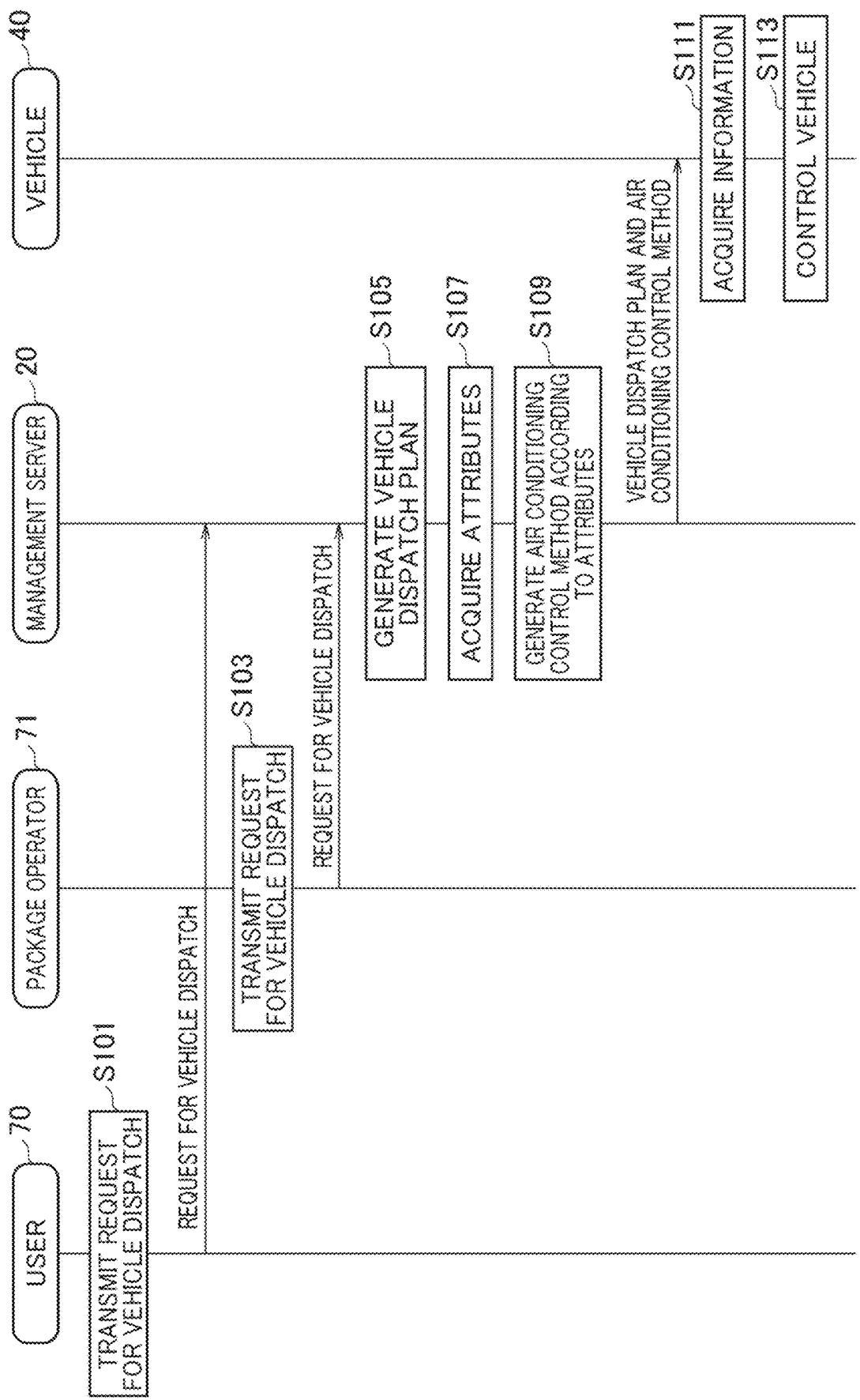
FIG. 4 is a sequence chart illustrating an operation example of a system according to an embodiment of the present invention.
Figure 5:
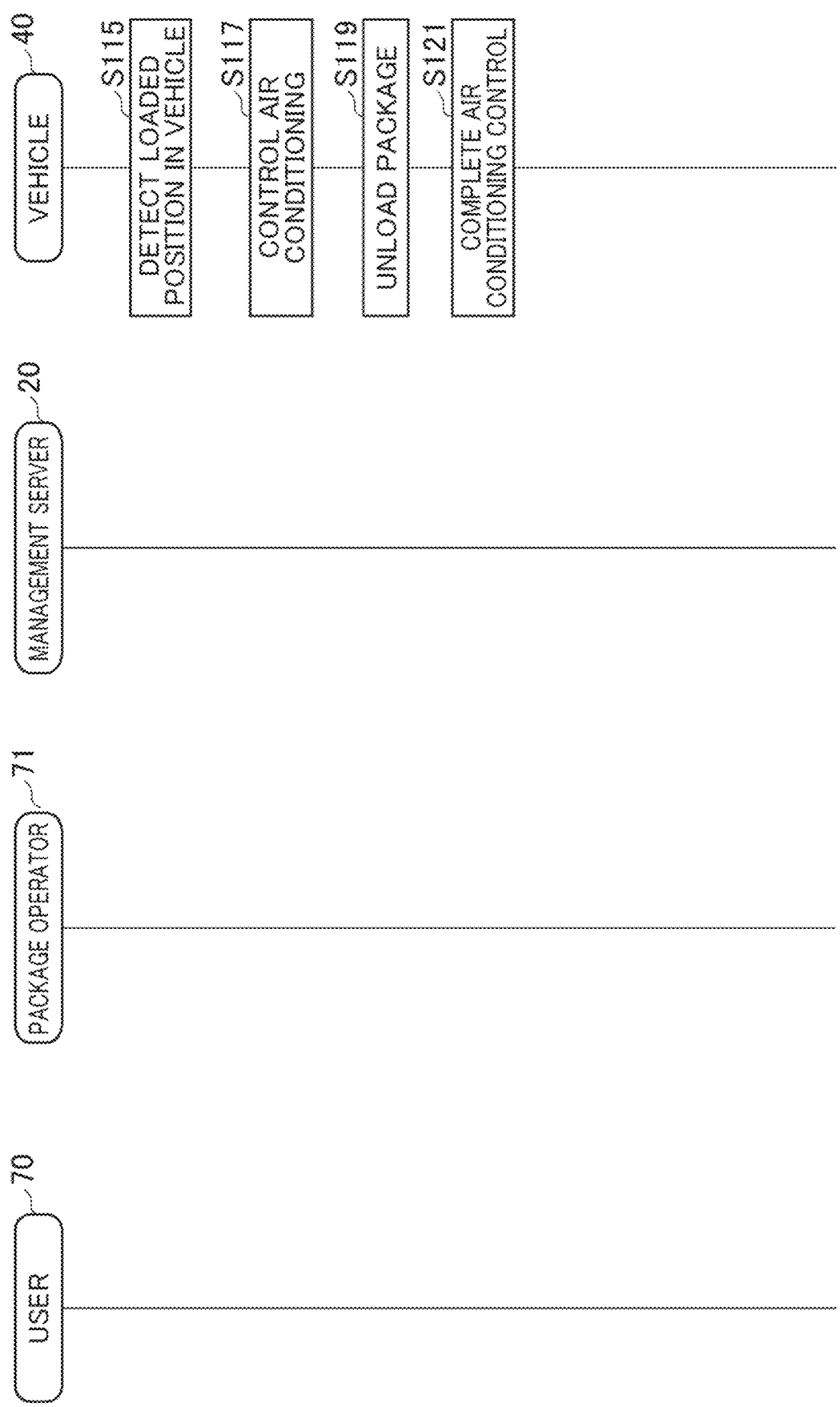
FIG. 5 is a sequence chart illustrating an operation example of a system according to an embodiment of the present invention.

Next, an operation example of the system 10 will be described with reference to a sequence charts of FIGS. 4 and 5. In stop S101, the user 70 requests a vehicle using the communication device 60. A request signal is transmitted from the communication device 60 to the management server 20. In step S103, the package operator 71 requests a vehicle using the communication device 61. A request signal is transmitted from the communication device 61 to the management server 20. In step S105, the management server 20 allocates a vehicle and calculates a travel route based on the received request. The process continues to step S107 and the management server 20 acquires the attributes of the user 70 and the package 80 by referring to the customer database 242. The process continues to step S109 and the management server 20 generates an air conditioning control method according to the attributes of the user 70 and the package 80. The management server 20 transmits a vehicle dispatch plan including a travel route and the like, and the air conditioning control method to the vehicle 40.

Figure 6:
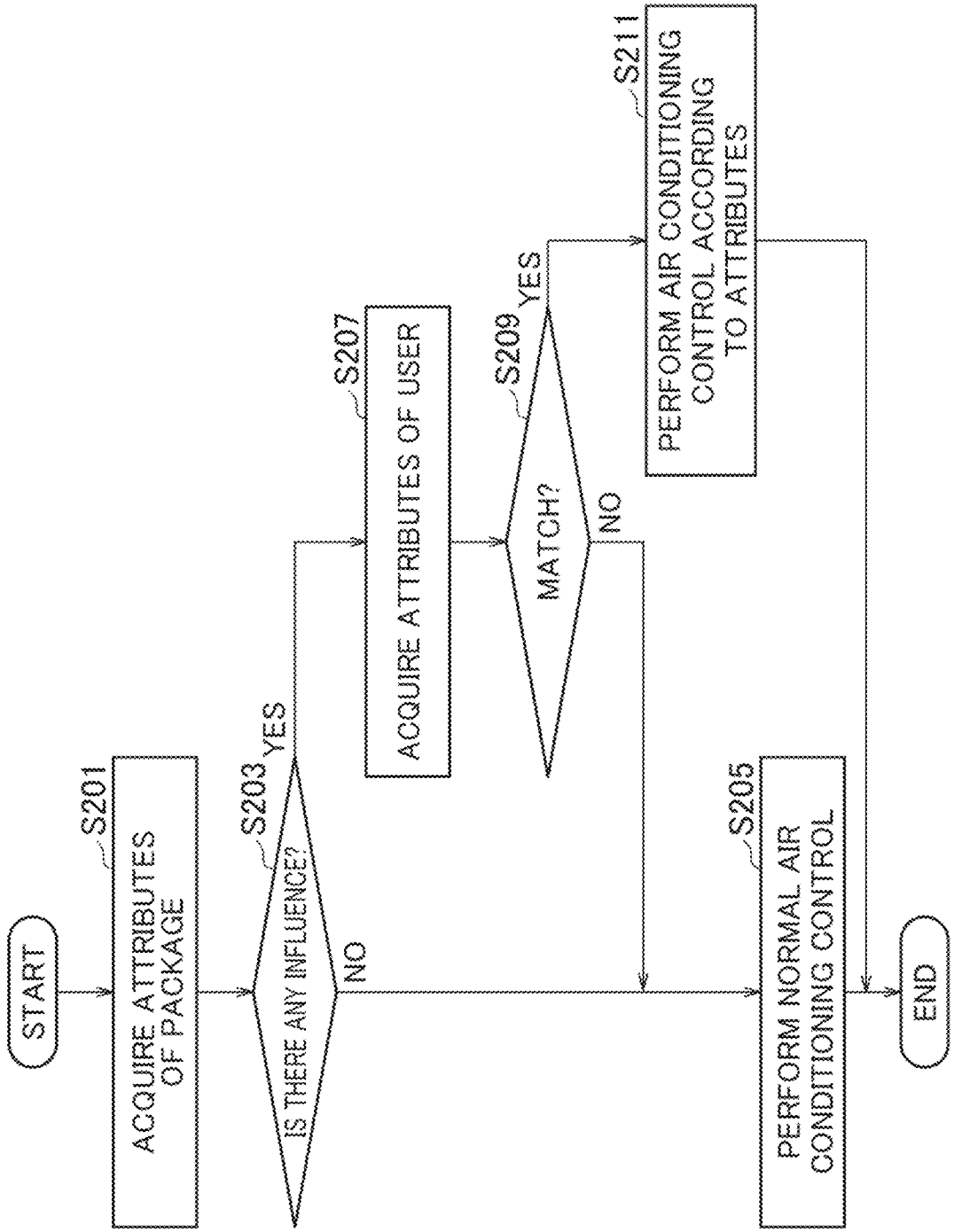
FIG. 6 is a flowchart illustrating an operation example of a vehicle control device according to an embodiment of the present invention.

In step S111, the vehicle 40 acquires the vehicle dispatch plan and the air conditioning control method from the management server 20. The process continues to step S113 and the vehicle ECU 402 controls various actuators to allow the vehicle 40 travel along the travel path. The vehicle 40 heads to the desired place to be loaded for the user 70 to load the user 70 into the vehicle. Further, the vehicle 40 heads to a desired loading place of the package 80 and loads the package 80. The process continues to step S115 and the camera 403 or the seat sensor 404 detects the position of the seat on which the user 70 is seated and the position of the seat on which the package 80 is placed. The process continues to step S117 and the HVAC system 405 controls the air conditioning using the air conditioning control method acquired from the management server 20. The process continues to step S119 and the package is unloaded at a desired unloading place of the load 80, and the air conditioning control is completed. Details of the processes in steps S107, 109, 115, and 117 will be described with reference to FIGS. 6 to 8.

First, details of step S107 will be described. In step S201 in FIG. 6, when the management server 20 acquires attributes of the user 70 and the package 80, it first acquires attributes of the package 80. That is, the package 80 comes first and the user 70 comes later in the acquisition order of attributes. The management server 20 determines whether the attributes of the package 80 may affect the user 70. As described in FIG. 3, if the attributes of the package 80 include any of an allergy, an odor, and a temperature, the management server 20 determines that the attributes of the package 80 may affect the user 70 ("YES" in step S203). If it is determined to be "NO" in step S203, that is, there is no attribute of the package 80 (the attributes of the package 80 is not registered), a normal air conditioning control is performed (step S205).

In step S207, the management server 20 acquires the attributes of the user 70. The process continues to step S209 and the management server 20 determines whether the attributes of the user 70 matches the attributes of the package 80. The "attribute match" occurs when a pollen allergy is registered as an attribute of the user 70 and a plant dispersing pollen is registered as an attribute of the package 80. Alternatively, the "attribute match" occurs when an odor aversion is registered as an attribute of the user 70 and a lunch box that emits an odor is registered as an attribute of the package 80. Alternatively, the "attribute match" occurs when an interior temperature is registered as an attribute of the user 70 and a food that needs refrigeration is registered as an attribute of the package 80. Alternatively, the "attribute match" may be defined as a case in which keywords related to attributes of the user 70 and the package 80 match. Alternatively, the "attribute match" may be defined as a case in which properties, features, characteristics, and the like related to attributes of the user 70 and the package 80 match. If the attributes of the user 70 match those of the package 80 (YES in step S209), the process continues to step S211 and the management server 20 performs air conditioning control depending to the attributes of the user 70 and the package 80. The determination of matching is performed in the process in step S107 (FIG. 4).

Next, the details of step S115 will be described. FIG. 7 shows the interior of the vehicle 40. Reference signs 90 and 91 denote an air conditioning device with an HVAC system 405 including a cooling device, a heating device, a blower, and the like. Reference sign 92 denotes an exhaust port. Reference signs 93 to 96 denote a seat. As illustrated in FIG. 7, it is assumed that the user 70 is seated on a seat 96 and the package 80 is placed on a seat 94. In this case, the camera 403 or the seating sensor 404 detects the position of the seat on which the user 70 is seated and the position of the seat on which the package 80 is placed.

Next, the details of steps S109 and S117 will be described. The air conditioning control method generator 214 generates an air conditioning control method based on the position of the seat detected by the camera 403 or the seating sensor 404. In FIG. 7, it is assumed that a pollen allergy is registered as an attribute of the user 70 and a plant dispersing pollen is registered as an attribute of the package 80. In this case, the attribute of the user 70 and the attribute of the package 80 match. The air conditioning control method generator 214 generates an air conditioning control method so that the influence of the package 80 on the user 70 is reduced. A method of blowing air from the blower 90 and 91 toward the exhaust port 92 as illustrated in FIG. 7 is an example of the air conditioning control method. With this method, an influence of the allergen of the package 80 (plant) on the user 70 can be reduced. In another example, it is assumed that the user 70 has a registered attribute of an odor aversion, and a lunch box that emits odor has been registered as an attribute of the package 80. In this case, a method of blowing air from the blower 90 and 91 toward the exhaust port 92 as illustrated in FIG. 7 is also applied. Thus, the influence of the odor of the package 80 (lunch box) on the user 70 can be reduced. The air may be blown from the blower 90 and 91 toward the user 70. Thus, the air around the user 70 always flows, and the influence of an allergen or an odor can be reduced. Furthermore, the air may be blown so that the user 70 is located upstream and the package 80 is located downstream relative to the airflow. It should be noted that reducing an influence on the user 70 includes a case in which there is no influence on the user 70.

Figure 8:
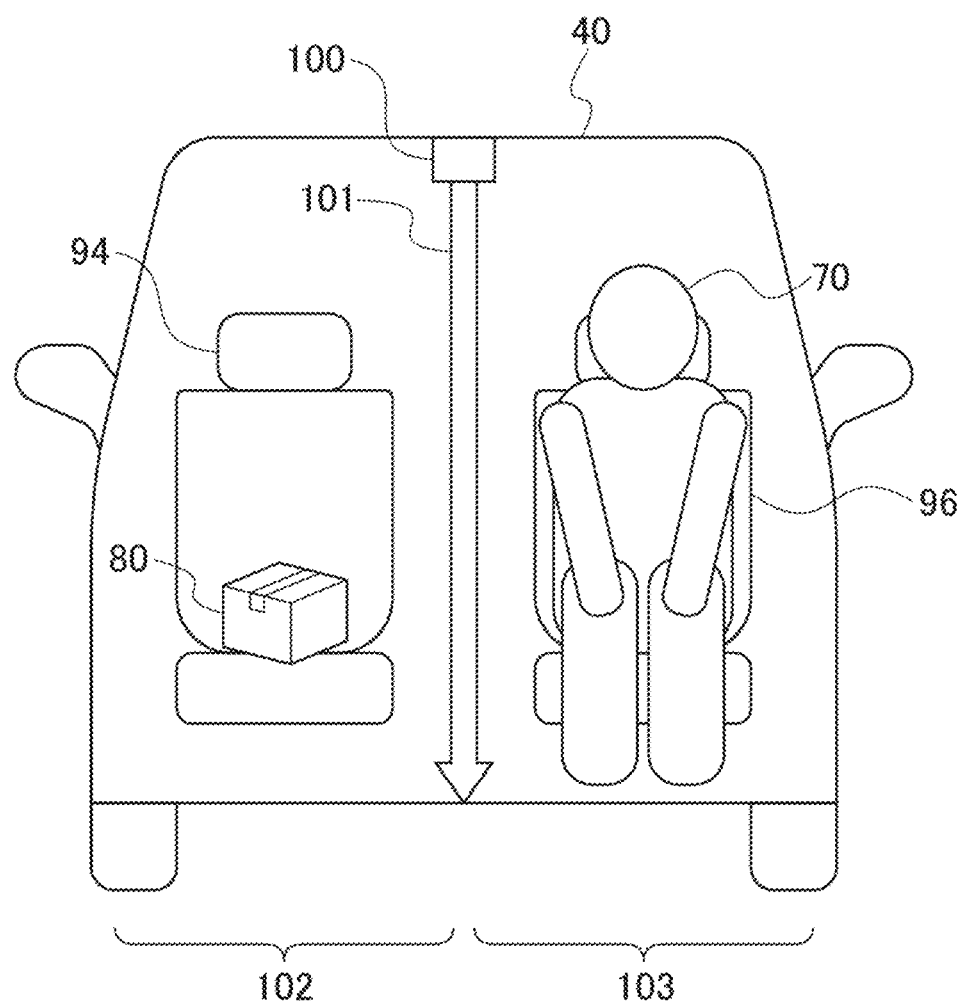
FIG. 8 is a diagram illustrating an example of an air conditioning control method.

As another example, it is assumed that an interior temperature is registered as an attribute of the user 70 and a food that needs refrigeration is registered as an attribute of the package 80. An air curtain illustrated in FIG. 8 is an example of an air conditioning control method in this case. Reference sign 100 in FIG. 8 indicates an air curtain generator (a type of HVAC system 405), and reference sign 101 indicates an air curtain. An "air curtain" generates a film of fast airflow to block air movement. The term "block" is used not only to completely block air movement but also to suppress air movement. The "air curtain" is provided to block air conditioning and prevent the intrusion of odors, enabling a use of a space without providing walls or partitions. The air curtain 101 in this embodiment generates a film of airflow from a ceiling to a floor. As illustrated in FIG. 8, the interior of the vehicle 40 is separated into regions 102 and 103 by the air curtain 101. The region 102 is cooled to 10 degrees or less by a cooling device. Thus, the package 80 (refrigerated food) is kept at an appropriate temperature. Cold air circulating in the region 102 by the air curtain 101 does not flow into the region 103. Thus, the user 70 can reduce the influence of cold air. Thus, even a user who does not like cold air can be loaded into the vehicle 40 at the same time as refrigerated food. The region 103 can be adjusted to a desired temperature for the user 70. For example, if the desired temperature for the user 70 is 23 degrees, the HVAC system 405 can be controlled so that the region 103 is at 23 degrees. Even if the area 103 is set to 23 degrees, the area 102 is not influenced by the air curtain 101 and is kept at 10 degrees or less. It is noted that the air curtain 101 can also be applied to the above-mentioned allergies and odors. In place of the air curtain 101, a physical shield such as a shutter or a partition board may be provided to block air movement.

Operation and Effect

As described above, according to this embodiment, the following operation and effect can be obtained.

The management server 20 (controller) acquires the attributes of the user 70 and the attributes of the package 80. Acquisition of the attributes is realized by referring to the customer database 242. The management server 20 determines whether the user 70 and the package 80 are loaded in the vehicle. This determination is made based on data detected by the camera 403 or the seating sensor 404. When the management server 20 determines that the user 70 and the package 80 are loaded in the vehicle, it performs air conditioning control according to the attributes of the user 70 and the package 80. Thus, it is possible to perform air conditioning control considering the attributes of both the user 70 and the package 80.

The attributes of the user 70 include information on a prescribed allergy or information indicating a preference on the air in the interior of the vehicle. "Information indicating a preference on the air in the interior of the vehicle" is information indicating a preference of the user 70 on the odor and temperature in the interior of the vehicle. Attributes of the package 80 include information on a prescribed allergy, information on an odor, or information indicating that temperature control is required.

Air conditioning control includes at least one of the following: controlling an airflow to reduce the influence of the package 80 on the user 70; blocking a space between the package 80 and the user 70 with the airflow; and blocking the space between the package 80 and the user 70 with a physical device. The management server 20 selects one of the three air conditioning controls according to the attributes of the user 70 and the package 80 to perform air conditioning control. Thus, the user 70 is not influenced by the package 80, and a comfortable interior space can be provided to the user 70.

Each of the functions described in the above embodiments may be implemented by one or more processing circuits. The one or more processing circuits include a programmed processing device such as a processing device including an electric circuit. Further, the one or more processing circuits include a device such as an application-specific integrated circuit (ASIC) or circuit component arranged to perform each of the described functions.

Although embodiments of the present invention have been described above, the statements and drawings that form a part of this disclosure should not be understood as limiting the present invention. The present disclosure will reveal to those skilled in the art a variety of alternative embodiments, embodiments, and operational techniques.

Although the management server 20 is described as a vehicle control device, the vehicle control device is not limited to the management server 20. The configuration and functions of the management server 20 may be mounted on the vehicle 40. In this case, the controller mounted on the vehicle 40 functions as a vehicle control device. The attributes of the package 80 need not necessarily be registered in advance. The package operator 71 may enter the attributes of the package 80 when reserving a vehicle. Furthermore, the vehicle 40 may be provided with a sensor for detecting an odor, and the sensor may detect whether the package 80 emits an odor when loaded.

REFERENCE SIGNS LIST

20 management server
211 vehicle dispatch reception
212 allocator
213 travel route calculator
214 air conditioning control method generator

The invention claimed is:

1. A vehicle control device used for a vehicle that simultaneously transports a user and a package, the vehicle control device comprising a controller,
wherein the controller is configured to:
acquire an attribute of the package;
determine whether the attribute of the package may affect the user;
determine that the attribute of the package may not affect the user in a case where the attribute of the package is not registered;
upon determining that the attribute of the package may affect the user, acquire an attribute of the user and determine whether the attribute of the user matches the attribute of the package;
determine whether the user and the package are loaded in the vehicle;
upon determining that the attribute of the package may not affect the user and upon determining that the user and the package are loaded in the vehicle, perform a normal air conditioning control; and
upon determining that the attribute of the user matches the attribute of the package and upon determining that the user and the package are loaded in the vehicle, perform air conditioning control according to the attribute of the user and the attribute of the package.

2. The vehicle control device according to claim 1,
wherein the attribute of the user includes information on a prescribed allergy or information indicating a preference on air in an interior of the vehicle; and
wherein the attribute of the package includes information on a prescribed allergy, information on an odor, or information indicating requirement of temperature control.

3. The vehicle control device according to claim 2, wherein
the air conditioning control includes at least one of: (a) controlling airflow to reduce an influence of the package on the user; (b) blocking a space between the package and the user with airflow; and (c) blocking the space between the package and the user with a physical device; and
the controller is configured to select one of the aforementioned (a) to (c) to perform the air conditioning control according to the attribute of the user and the attribute of the package.

4. A vehicle control method of a vehicle control device used for a vehicle that simultaneously transports a user and a package, the vehicle control method comprising:
acquiring an attribute of the package;
determining whether the attribute of the package may affect the user;
determining that the attribute of the package may not affect the user in a case where the attribute of the package is not registered;
upon determining that the attribute of the package may affect the user, acquiring an attribute of the user and determining whether the attribute of the user matches the attribute of the package;
determining whether the user and the package are loaded in the vehicle;
upon determining that the attribute of the package may not affect the user and upon determining that the user and the package are loaded in the vehicle, performing a normal air conditioning control; and
upon determining that the attribute of the user matches the attribute of the package and upon determining that the user and the package are loaded in the vehicle, performing an air conditioning control according to the attribute of the user and the attribute of the package.

* * * * *